(No Model.)

DE WANE B. SMITH.
HARROW.

No. 423,705. Patented Mar. 18, 1890.

WITNESSES
Rich. George.
M. E. Robinson

INVENTOR.
De Wane B. Smith
By Risley & Perry
Attys

UNITED STATES PATENT OFFICE.

DE WANE B. SMITH, OF DEERFIELD, NEW YORK.

HARROW.

SPECIFICATION forming part of Letters Patent No. 423,705, dated March 18, 1890.

Application filed October 26, 1889. Serial No. 328,261. (No model.)

*To all whom it may concern:*

Be it known that I, DEWANE B. SMITH, of Deerfield, in the county of Oneida and State of New York, have invented certain new and useful Improvements in Harrows; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an improvement in harrows.

Figure 1:
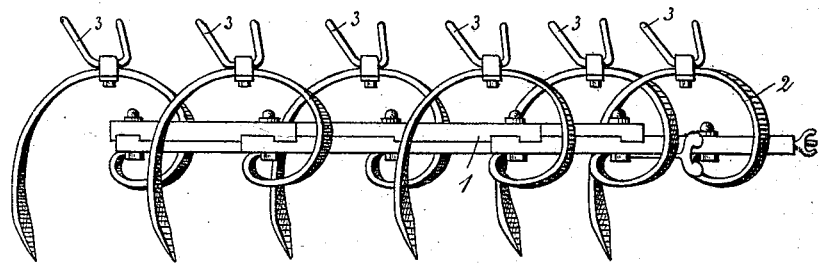
Figure 2:
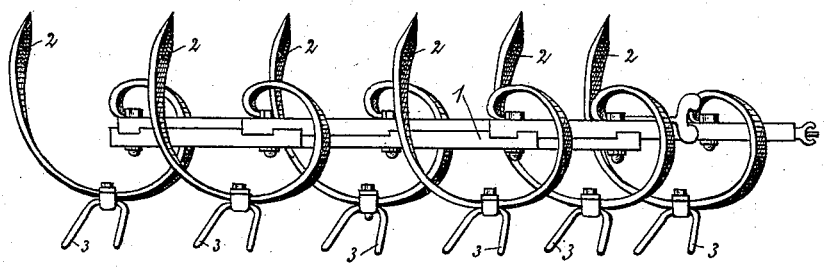
Figure 3:
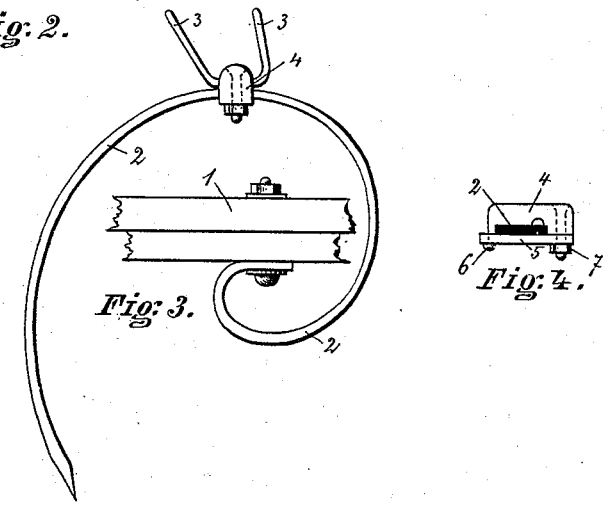
Figure 4:
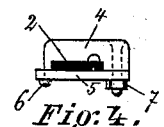

In the drawings which accompany and form part of this specification, and in which similar figures of reference refer to like parts in the several figures, Figure 1 shows a section of a spring-tooth harrow involving features of my invention. Fig. 2 shows the same, the other side up, and with the smoothing-teeth in position for use. Fig. 3 shows one spring-tooth, a section of the frame, and a smoothing-tooth attached thereto. Fig. 4 shows details of construction hereinafter more fully explained.

The more particular features of this invention consist in combining a smoothing-harrow, or, rather, smoothing-teeth, with the teeth of a curved spring-tooth harrow.

Referring to the drawings, 1 indicates the frame of an ordinary spring-tooth harrow.

2 2, &c., are the curved spring-teeth secured to the under side of the frame, and curving downward, forward, and upward, and projecting their working-points below the frame.

3 3 are the smoothing-teeth, secured, as shown in Figs. 1, 2, and 5, in a clipping-piece 4, which spans the spring-tooth 2, and is provided with a latch 5, which engages on hooked projection 6 of the clipping-piece, and is secured thereto by a bolt and nut 7, passing through openings in both the clipping-piece and the clip-latch, which clipping-piece 4 is secured to the highest bow-point of each spring-tooth, and each clip is preferably provided with two teeth, as shown, one of which teeth is substantially square to the line of draft of the harrow and one slanting rearward from this position. The position of the clip 4 may be adjusted on the upper bow of the teeth 2, so that the position or pitch of the smoothing-teeth with reference to the line of the movement of the harrow when the smoothing-teeth are in use may be varied.

The use and operation of the device are obvious. When the harrow is in the position shown in Fig. 1, the action is that of an ordinary spring-tooth harrow. When it is desired to bring the smoothing-teeth into use, the harrow is inverted in the position shown in Fig. 2, in which position the smoothing-teeth 3 become effective. The bow of the tooth in its upward curve acts as a runner or shoe, limiting the depth of cut of the smoothing-teeth.

It is obvious that alterations and variations in and from the construction described may be made without departing from the spirit of my invention.

What I claim as new, and desire to secure by Letters Patent, is—

1. The combination, with the harrow-frame and curved spring-tooth of a spring-tooth harrow, of the smoothing-teeth secured to the upper bow of the curved spring-tooth, substantially as set forth.

2. The combination of a curved spring-tooth and the smoothing-teeth secured to the tooth, substantially as set forth.

3. The combination, in a harrow, of the frame, the curved spring-tooth secured to the frame, and the smoothing-teeth adjustably secured upon the curved spring-tooth, substantially as set forth.

4. The combination, in a harrow, of the frame, the curved spring-tooth, and the smoothing-teeth secured to the spring-tooth by clip, substantially as set forth.

In witness whereof I have affixed my signature in presence of two witnesses.

DE WANE B. SMITH.

Witnesses:
M. E. ROBINSON,
JOSIAH PERRY.